(12) United States Patent
Bergman et al.

(10) Patent No.: US 7,739,779 B2
(45) Date of Patent: Jun. 22, 2010

(54) METHOD FOR OPENING A CYLINDRICAL PRESSURE VESSEL

(75) Inventors: Carl Bergman, Västerås (SE); Gert Persson, Västerås (SE)

(73) Assignee: Avure Technologies AB, Vasteras (SE)

( * ) Notice: Subject to any disclaimer, the term of this patent is extended or adjusted under 35 U.S.C. 154(b) by 275 days.

(21) Appl. No.: 11/980,354

(22) Filed: Oct. 31, 2007

(65) Prior Publication Data
US 2008/0121120 A1 May 29, 2008

Related U.S. Application Data

(62) Division of application No. 10/479,681, filed as application No. PCT/SE02/01210 on Jun. 20, 2002.

(30) Foreign Application Priority Data
Jun. 20, 2001 (SE) .................................... 0102191

(51) Int. Cl.
  B23P 11/00 (2006.01)
  F17C 1/00 (2006.01)
  F17C 13/06 (2006.01)
(52) U.S. Cl. .................. 29/426.1; 29/426.3; 29/525.01; 220/582; 220/319
(58) Field of Classification Search ................ 29/426.1, 29/426.3, 426.5, 525.01; 220/378, 328, 582, 220/319; 100/26.01, 269.01
See application file for complete search history.

(56) References Cited

U.S. PATENT DOCUMENTS

| 2,252,488 A | 8/1941 | Bierend |
| 2,821,325 A | 1/1958 | Chapellier et al. |
| 2,989,209 A | 6/1961 | Hersman |
| 3,667,649 A | 6/1972 | Thillet |
| 3,695,482 A | 10/1972 | Smith |
| 4,565,297 A | 1/1986 | Korner et al. |
| 4,874,573 A | 10/1989 | Wood et al. |
| 5,036,996 A | 8/1991 | Epstein |

*Primary Examiner*—Jermie E Cozart
(74) *Attorney, Agent, or Firm*—Harness, Dickey & Pierce, P.L.C.

(57) ABSTRACT

The present invention relates to a press which comprises a pressure vessel having an internal closure. The internal closure comprises a cover, a number of elements for transmitting forces in pressurized operation between the cover and the inner wall of the pressure vessel. Each element has a first contact surface adapted to fit a contact surface of the cover and a second contact surface adapted to fit a contact surface of the inner wall of the pressure vessel. Said elements are movable away from said contact surface of the cover and said contact surface of the inner wall of the pressure vessel in the direction of the longitudinal centre axis of the pressure vessel. The invention also relates to a method for opening a pressure vessel.

17 Claims, 7 Drawing Sheets

METHOD FOR OPENING A CYLINDRICAL PRESSURE VESSEL

This application is a Divisional Application of U.S. application Ser. No. 10/479,681, filed Dec. 3, 2003,which is still and which is the national phase under 35 USC §371 of PCT International Application No. PCT/SE02/01210 filed on Jun. 20, 2002, which designated the United States of America, and which claims priority from Sweden Patent Application No. SE 0102191-4 filed on Jun. 20, 2001, the entire contents of all of which are hereby incorporated herein by reference.

FIELD OF THE INVENTION

The present invention relates to a press, which comprises a pressure vessel having an internal closure, and a method for opening a pressure vessel which is included in a press.

BACKGROUND ART

Many industrial manufacturing processes use presses, such as high-pressure presses. A common type of press, e.g. for machining aluminium pieces, comprises a pressure vessel in which the actual pressing operation takes place and, which is provided with some type of closure, such as a cover. Traditionally, the cover has been screwed to the wall of the pressure vessel by means of a threaded connection. After each pressing operation when a processed material is to be removed from the press, the cover has to be unscrewed, which is a time-consuming procedure.

U.S. Pat. No. 4,565,297 discloses an alternative embodiment of the closure between cover and pressure vessel, several support segments being arranged between the cover and the pressure vessel. The sealing force which originates from the cover is transmitted via these segments to the pressure vessel. In particular, the force transmission takes place via parallel, specially designed contact surfaces. The disadvantage of the shown construction is that the segments are exposed to great strain at the risk of pressure concentrations arising in certain portions, which can lead to the segments cracking and needing to be replaced earlier than desirable.

Another disadvantage is that any transverse forces acting on the segments can make the segments slide upwards to the axis of the pressure vessel and, therefore, it has been necessary to arrange special locking elements which with their vertical contact surfaces against the segments and the cover, respectively, prevent such a motion. In addition, the removal of the cover with the purpose of reaching the inside of the pressure vessel seems to be a time-consuming procedure.

U.S. Pat. No. 2,821,325 discloses yet another variant of a closure for pressure vessels. Several segments having rounded contact surfaces are arranged between the cover and the pressure vessel. However, the construction is such that it is difficult to remove the cover. An actuating lever is used to tilt the segments to a desired position before the cover can be removed. Also this known technique thus involves a time-consuming procedure.

SUMMARY OF THE INVENTION

In object of the present invention is to provide a press which allows simple handling and which reduces the above-mentioned disadvantages.

Another object of the invention is to provide a method that allows the pressure vessel to be easily opened after a pressing operation has been carried out.

These and other objects which will be evident from the following description are achieved by means of a press and a method, which have the features that are stated in the appended claims.

According to one aspect of the invention, a press is provided which comprises a pressure vessel having an internal closure. The internal closure comprises a cover and a number of elements for transmitting forces in pressurised operation between the cover and the inner wall of the pressure vessel. Each force-transmitting element has a first contact surface adapted to fit a contact surface of the cover and a second contact surface adapted to fit a contact surface of the inner wall of the pressure vessel. According to the invention, the pressure vessel is arranged in such a manner that the cover is allowed to assume two different positions in the axial direction of the pressure vessel, namely a first position when the pressure vessel is pressurised and when said elements transmit forces from the cover to the inner wall of the pressure vessel, and a second position when the pressure vessel is essentially unpressurised and each element is movable away from said contact surface of the cover and said contact surface of the inner wall of the pressure vessel in the direction of the longitudinal centre axis of the pressure vessel.

Consequently, the invention is based on the insight that contact surfaces of covers and pressure vessels do not need to be used as a support for the elements in connection with the actual opening of the pressure vessel, and that the cover can be made movable in order to facilitate a displacement of the elements from these contact surfaces. This allows a simple opening procedure since the cover is dimensioned so that the elements can quickly be arranged in such a manner that they have no contact with said contact surfaces of pressure vessels and covers.

It should also be understood that, according to at least one embodiment of the invention, said displacement of the elements can comprise the partial steps of first separating said elements and said contact surface of the cover from one another and, subsequently, separating said elements and said contact surface of the inner wall of the pressure vessel from one another.

Even if it is possible within the scope of the present invention to use both straight contact surfaces and other shapes of the contact surfaces of said force-transmitting elements, cover and inner wall of the pressure vessel, it may be advantageous to have rounded contact surfaces. By using contact surfaces of said elements which are curved in a longitudinal plane of section which is axial to the pressure vessel, relative motions can be permitted between cover and vessel wall without any risk of detrimental pressure concentrations on said elements. In such designs, said contact surfaces are suitably curved or rounded in a longitudinal plane of section which is axial to the pressure vessel so that forces which are transmitted between the cover and the inner wall of the vessel provide an essentially uniformly distributed contact pressure between the cover and said force-transmitting element on the one hand, and said force-transmitting element and the inner wall of the vessel, on the other. In the rest of the description, the stress will be put on such curved contact surfaces. As stated above, it should be understood that the invention also can be used for other forms of contact surfaces.

In a press according to the invention, the pressure in the pressure vessel during a pressing operation is typically 50-2000 bar. During such a pressing operation, the cover tends to bend axially upwards/outwards and the wall of the pressure vessel tends to bend radially outwards. The curved contact surfaces take these deformations in the cover and the vessel wall into consideration, so that a moderate and uniformly distributed contact pressure is obtained. When the cover and the vessel wall are deformed due to the internal overpressure, dimensional adaptation takes place by a "rocking sliding motion" in the curved contact surfaces. Due to the curved contact surfaces, a large advantage is obtained in that the deformations of the vessel wall and the cover do not cause as large concentrations in the contact pressure as would have been caused by straight contact surfaces.

As mentioned above, each force-transmitting element has a first contact surface that fits a contact surface of the cover and a second contact surface that fits a contact surface of the inner wall of the vessel. Said first contact surface has thus suitably an essentially circular-arc cross-section with a radius that essentially corresponds to the radius of a circular-arc cross-section of the contact surface of the cover. Said second contact surface and the contact surface of the vessel also have the same agreement between the radii of the respective essentially circular-arc cross-sections.

Consequently, the curvature of the contact surfaces is suitably based on calculations of the deformation of the cover and the vessel wall, the respective curvatures being made so as to obtain the maximum even contact pressure between the force-transmitting elements and the cover and the vessel wall, respectively. In spite of the changes in angles that arise between the cover and the vessel wall, the even contact pressure is to be maintained.

The advantageous shape can be made either convex or concave. It is thus possible to form said force-transmitting elements so that said first and second contact surfaces bend outwards to the cover and the wall of the pressure vessel, respectively. Alternatively, the high-pressure press can be adapted for elements having inwardly curved contact surfaces. Yet another alternative is to let one of said first and second contact surfaces bend inwards and the other contact surface bend outwards.

The force-transmitting elements together form an annular configuration in the circumferential direction of the pressure vessel. Each force-transmitting element thus suitably constitutes a toroidal part. When opening the cover, said elements are removed by moving them radially towards the centre axis of the pressure vessel and are thus removed from the contact surfaces of the cover and the pressure vessel wall, respectively, which will be described below in more detail. This means that in the annular configuration which said force-transmitting elements form, there should be sufficient space between two adjacent elements in order to move these radially inwards to the centre axis since the circumference of the annular configuration decreases nearer the centre axis. The number of force-transmitting elements is preferably at least three, for instance at least four, in particular six. However, as an alternative force-transmitting elements can be used, which are only two in number. In this case, the force-transmitting elements are bendable.

In this application text, the centre axis is defined as the straight centre axis which runs in the altitude of a cylinder. The force-transmitting elements are essentially adapted to transmit axial forces.

According to the invention, the press is designed so that the cover is movable between a first and a second position. For a vertically arranged pressure vessel, the cover, either a bottom cover or a top cover, is vertically adjustable. This adjustability facilitates the removal and the mounting of said elements. In the press according to U.S. Pat. No. 4,565,297, there is no such mechanism since the plane contact surfaces allow the segments to be moved in a direction obliquely upwards to the centre axis of the pressure vessel without vertically adjusting the cover. However, it is necessary that special locking elements be arranged between the segments and the cover in order to prevent the segments from undesirably sliding towards the centre axis when they are exposed to transverse forces. It should also be noted that if a pressure vessel in a press according to the invention is arranged horizontally, i.e. the centre axis extends horizontally, said first and second position of the cover would be separated in the horizontal direction.

In the press according to the present invention, the rounded shape of the contact surfaces has such an inherent property that the elements to a certain extent are prevented from being undesirably radially moved towards the centre axis, in contrast to prior-art smooth, plane contact surfaces. Thus, it is not necessary to use an extra locking element for the invention. As will be evident from the following, a filling element between the force-transmitting elements and the cover, however, presents an advantageous embodiment of the invention.

Although it is not necessary to use any supplementary locking element, it may be desirable to ensure that undesired motion of said elements in the direction of the centre axis caused by transverse forces essentially does not occur, i.e. it is not desirable to allow each element with its centre of mass to be moved in an uncontrolled manner towards the centre axis. However, it is desirable to allow the sliding motion of the force-transmitting elements rocking round the centre of mass so that they reach the correct position before a pressing operation. Thus, the closure can be such that a side of each force-transmitting element facing the centre axis is in contact with a portion of the cover, the cover per se blocking lateral motion of the elements.

When a pressing operation is completed, the finished material is to be removed from the pressure vessel, which means that the cover first is to be removed. To allow removal of the cover, the force-transmitting elements are first removed. As mentioned above, these are preferably prevented from moving laterally by a portion of the cover. The solution is first to lower the cover enough so that there is no obstacle to lateral movement of said force-transmitting elements. Like in a translational motion, the force-transmitting elements are then drawn towards the centre axis of the pressure vessel, for example, by means of actuators, such as hydraulic pistons, motor-driven ball bearing screws, pneumatic or mechanical actuators, after which the cover, and preferably the force-transmitting elements arranged thereon, are lifted away from the pressure vessel so that the inside of the pressure vessel becomes accessible. The force-transmitting elements are thus removed from that contact surface of the cover which is used during the actual pressing operation to a position above said contact surface.

As mentioned above, the first contact surface of said elements is thus during a pressing operation adapted to abut against said contact surface of the cover, which is a first contact surface of the cover. According to at least one embodiment of the invention, the cover also comprises a second contact surface against which the first contact surface of said elements is adapted to abut after a pressing operation when lifting the cover, or before a pressing operation when lowering the cover.

The method described above applies to a top cover. As regards a bottom cover, the removal is carried out vertically inversely, i.e. first the cover is elevated, said elements are moved inwards to the centre, and the cover is then removed by being lowered.

Alternatively, a filling element can be used, which is arranged between a side of each force-transmitting element facing the centre axis of the pressure vessel and the cover. This filling element which contributes to retaining said force-transmitting elements and preventing radial displacement, suitably comprises one single annular piece. The filling element is thus a supplementary protection. However, the force-transmitting elements will essentially rock unlike segments having straight contact surfaces which tend to slide out of position without any supplementary locking. Even though the filling element is not necessary, it exhibits an important advantage in this context. According to the preceding alternative without a filling element, it is necessary to lower the cover enough to allow the force-transmitting elements to be pulled radially inwards to the centre axis away from the contact surface of the cover. If the portion of the cover that constitutes this blocking function is just as high as each force-transmitting element, this means that the cover should be lowered a distance corresponding to this height, which typically can be 100-200 mm. The use of filling elements certainly involves that they have to be lifted to make it possible to remove the force-transmitting elements but, on the other hand, it is not necessary to lower the cover more than a few millimeters, typically less than 20 mm. The distance also depends on how much the contact surfaces are curved.

A top cover is elevated and lowered preferably automatically between the upper position, in which the cover is located in the pressurised state of the press, and the lower position, in which the cover is located when the press is not pressurised. In an unpressurised state, the cover is thus located in the lower position, each force-transmitting element with its first contact surface abutting against the contact surface of the cover. However, there will be a gap between the second contact surface of each force-transmitting element and the contact surface of the inner wall of the pressure vessel. When pressurizing the pressure vessel, the overpressure generated therein will affect the cover so that it moves upwards, the second contact surface of each force-transmitting element being brought in contact with the inner wall of the pressure vessel. In a corresponding way, the contact will cease when the pressure after the pressing operation is relieved and the cover is lowered again. Even though this described motion of the cover to a large extent is automatic, for example, hydraulic pistons can also be used for this purpose in order to obtain extra safety. These hydraulic pistons are preferably also used for removing the cover from the press so that the contents of the pressure vessel become accessible.

Alternatively, said gap can instead be formed between the cover and the force-transmitting elements, for example, by hydraulic pistons retaining the force-transmitting elements in contact with the contact surface of the vessel wall, while the cover is lowered after the pressing operation and is lifted (mechanically or by means of the internal pressure) before a new pressing operation. With the aid of retaining means, such as hydraulic, pneumatic, mechanical or electrical means, said elements can thus be adapted to be retained in essentially the same position while the cover is lowered from the upper position to the lower position in order to cause said elements to move away from the contact surface of the cover. The displacement of the cover must be considered to be equivalent to displacement of the elements themselves since the mutual relation is the same in both cases, i.e. the first contact surface of the elements and the contact surface of the cover are removed from one another.

According to at least one embodiment of the invention, the removal of the contact surfaces of the force-transmitting elements from the contact surface of the cover and the contact surface of the inner wall of the pressure vessel can thus be carried out in two separate steps. In a first stage, the elements are thus removed from the contact surface of the cover by this being lowered, i.e. moved from its first position to its second position, and in a subsequent second stage the elements are removed from the contact surface of the inner wall of the pressure vessel by each element in its totality being made to move towards the centre axis of the pressure vessel.

The force-transmitting elements having the curved contact surfaces according to the invention are preferably manufactured by turning.

DETAILED DESCRIPTION OF THE DRAWINGS

Figure 1:
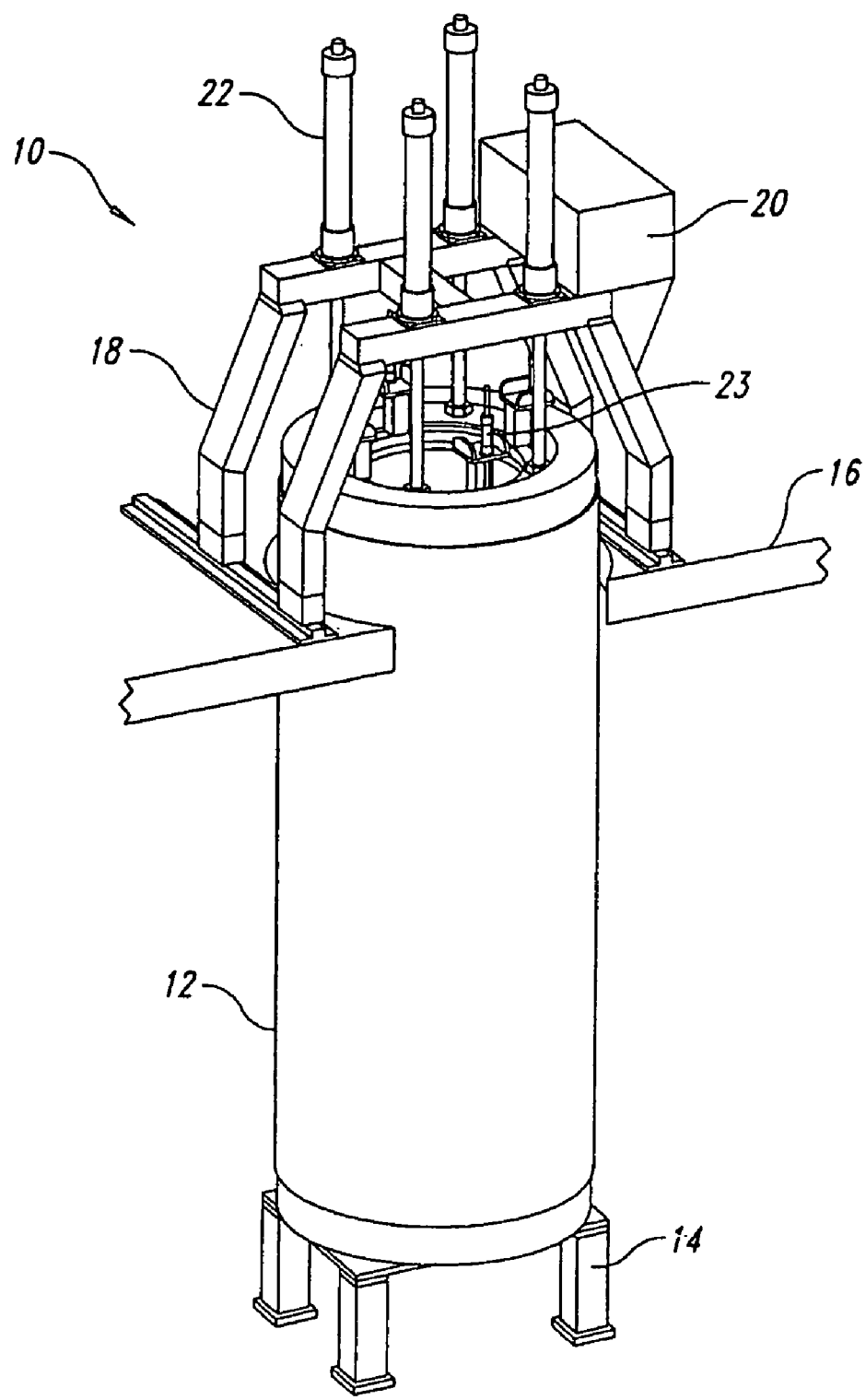
FIG. 1 is a perspective view of a high-pressure press according to the present invention.

FIG. 1 is a perspective view of a high-pressure press 10 according to the present invention. The high-pressure press 10 comprises a circular cylindrical pressure vessel 12 which is lowered into a cavity. The lower end of the pressure vessel 12 is located on a support 14 at the bottom of the cavity. An upper portion of the pressure vessel extends above the floor or ground level 16. A support arrangement 18 for a hydraulic device is attached to the floor. The hydraulic device comprises a hydraulic unit 20 which controls the vertical motion of four hydraulic pistons 22 for lifting and lowering a cover which closes the pressure vessel. The hydraulic device also comprises hydraulic pistons (not shown) for displacing force-transmitting elements, which will be described in the following. Furthermore, a hydraulic piston 23 is illustrated, the function of which, among other things, is to remove a filling element, which is illustrated in connection with the embodiment shown in FIGS. 4 and 5.

Figure 2:
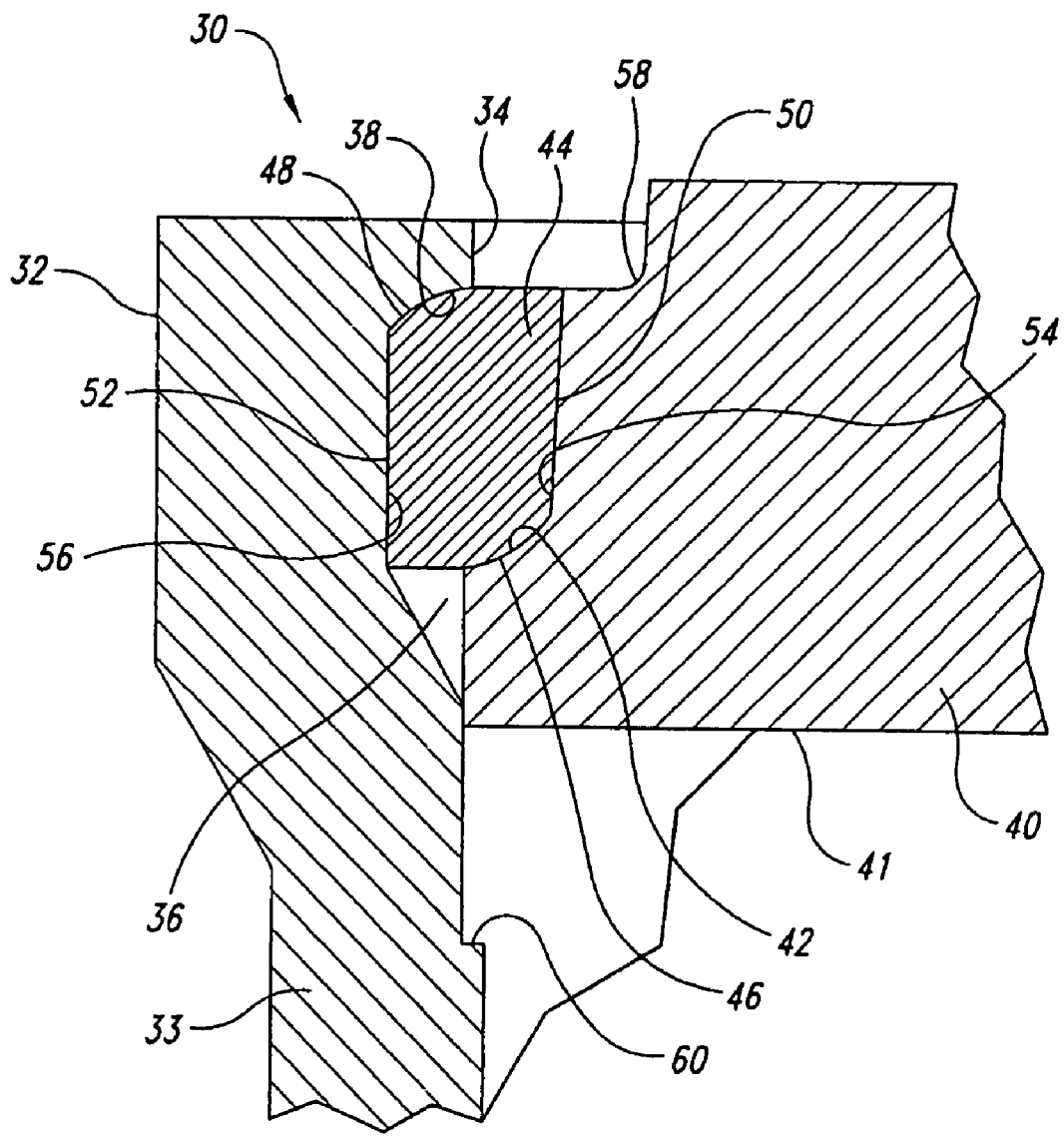
FIG. 2 is a schematic part-sectional view of a pressure vessel with an internal closure, which is comprised in a press according to an embodiment of the present invention.

FIG. 2 schematically shows a longitudinal part-sectional view of a pressure vessel 30 having an internal closure, the pressure vessel being comprised in a press according to an embodiment of the present invention. The upper portion 32 of the pressure vessel 30 has an enlarged radius. The pressure vessel comprises a wall 33, the inside 34 (also named inner wall) of which in this enlarged portion 32 is cut out so as to form a recess 36. The inner wall 34 is along the recess 36 essentially parallel to the outside of the pressure vessel 30 with the exception of the upper portion of the recess. In the upper portion of the recess 36, a contact surface 38 is formed, which is curved in the plane shown in the partial cross-sectional view. Since the pressure vessel 30 is cylindrical, the wall 33 of the pressure vessel 30 is curved round its longitudinal centre axis, i.e. in a transverse plane of section through the pressure vessel 30. This also applies to said contact surface 38 which is thus curved in two planes.

A solid cover 40 having a flat bottom surface is arranged in the pressure vessel 30 and is provided with a seal (not shown) that is suitable for this purpose. Similarly to the inner wall 34 of the pressure vessel 30, the cover 40 has a contact surface 42 which is curved in the longitudinal plane of section shown through the pressure vessel 30. A force-transmitting element 44 is arranged between the inner wall 34 of the pressure vessel 30 and the cover 40. The force-transmitting element 44 has a first lower contact surface 46 and a second upper contact surface 48 which are curved in the shown plane. The lower contact surface 46 is fitted into the contact surface 42 of the cover 40 and the upper contact surface 48 is fitted into the contact surface 38 of the inner wall 34. For optimal fitting, the contact surfaces 38, 48 and 42, 46, respectively, have essentially the same radii of curvature in the shown plane. In this Figure, the radii of curvature of the first contact surface and the second contact surface of the force-transmitting element 44 are also essentially of the same size, i.e. 100 mm. Based on calculation of the deformation of the cover 40 and the vessel wall 33, the contact surfaces 38, 42, 46, 48 are formed so as to obtain the maximum even contact pressure. Thus, the size (also relative proportions) of the radii can vary depending on press and application.

The force-transmitting element 44 is with its essentially vertical lateral surfaces 50, 52 in contact with essentially vertical surfaces 54, 56 of the cover 40 and the inner wall 34 of the pressure vessel 30, respectively. The vertical surface 54 of the cover 40 prevents the force-transmitting element 44 from sliding out of position. The pressure vessel 30 shown in FIG. 2 is pressurised, for example, to 1000 bar, which means that the internal overpressure presses the cover 40 axially upwards, which, in its turn, transmits the axial forces via the force-transmitting element 44 to the pressure vessel wall 33. Due to the curvature of the contact surfaces 38, 42, 46, 48 according to the invention, a uniformly distributed contact pressure is provided.

In addition, the cover 40 has in an upper portion a further contact surface 58 and the vessel wall 33 has a shoulder 60 protruding towards the centre. The functions of these parts 58 and 60 will be described in connection with FIG. 3.

Figure 3:
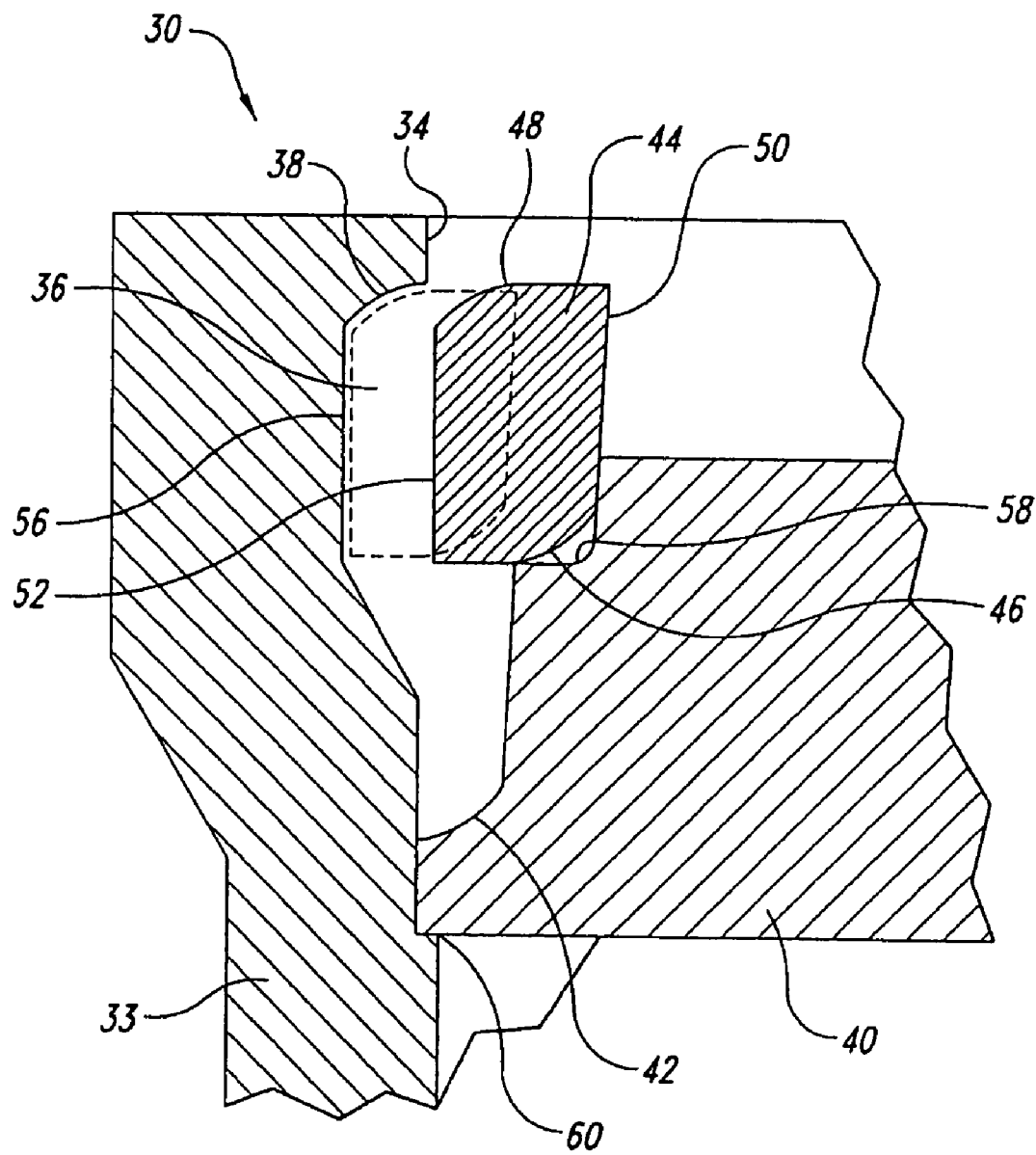
FIG. 3 schematically shows the pressure vessel in FIG. 2 when it is arranged to be opened.

FIG. 3 schematically shows the pressure vessel in FIG. 2 when prepared to be opened, the same reference numerals being used for equivalent parts in the Figures. After a completed pressing operation, the cover 40 is lowered in the pressure vessel 30 a distance corresponding to the height of the force-transmitting elements 44, while these are retained in the vertical position by means of suitable equipment such as hydraulic pistons (not shown), the first contact surface 46 of the force-transmitting elements thus being removed from the contact surface 42 of the cover by lowering the cover. The circumferential shoulder 60 which protrudes from the vessel wall 33 functions as a support for the cover 40 after this has been lowered. Subsequently, the force-transmitting elements 44 can be removed by hydraulic pistons (not shown) from the wall 33 of the pressure vessel 30 radially inwards to the centre axis of the pressure vessel 30. Consequently, the lower contact surface 46 of the force-transmitting element 44 will rest against that contact surface 58 of the cover 40 which is formed in the upper portion of the cover 40, as shown in FIG. 3 (dashed lines illustrate the position of the force-transmitting element before the displacement). Then the cover 40, with force-transmitting elements 44 resting thereon, is lifted out of the pressure vessel 30 by means of hydraulic pistons (not shown), after which the cover 40 is suitably removed sideways from the opening of the pressure vessel 30. The finished material can now be removed and new material be supplied to the pressure vessel 30. The opposite procedure follows, in which the cover 40 with force-transmitting elements 44 arranged thereon is lowered into the pressure vessel 30; the elements 44 are moved towards the vessel wall 33, the vessel 30 is pressurised and the cover 40 is lifted towards the elements 44. The elements 44 will slide into the correct angle due to the curvature of the contact surfaces 38, 42, 46, 48 according to the invention.

Figure 4:
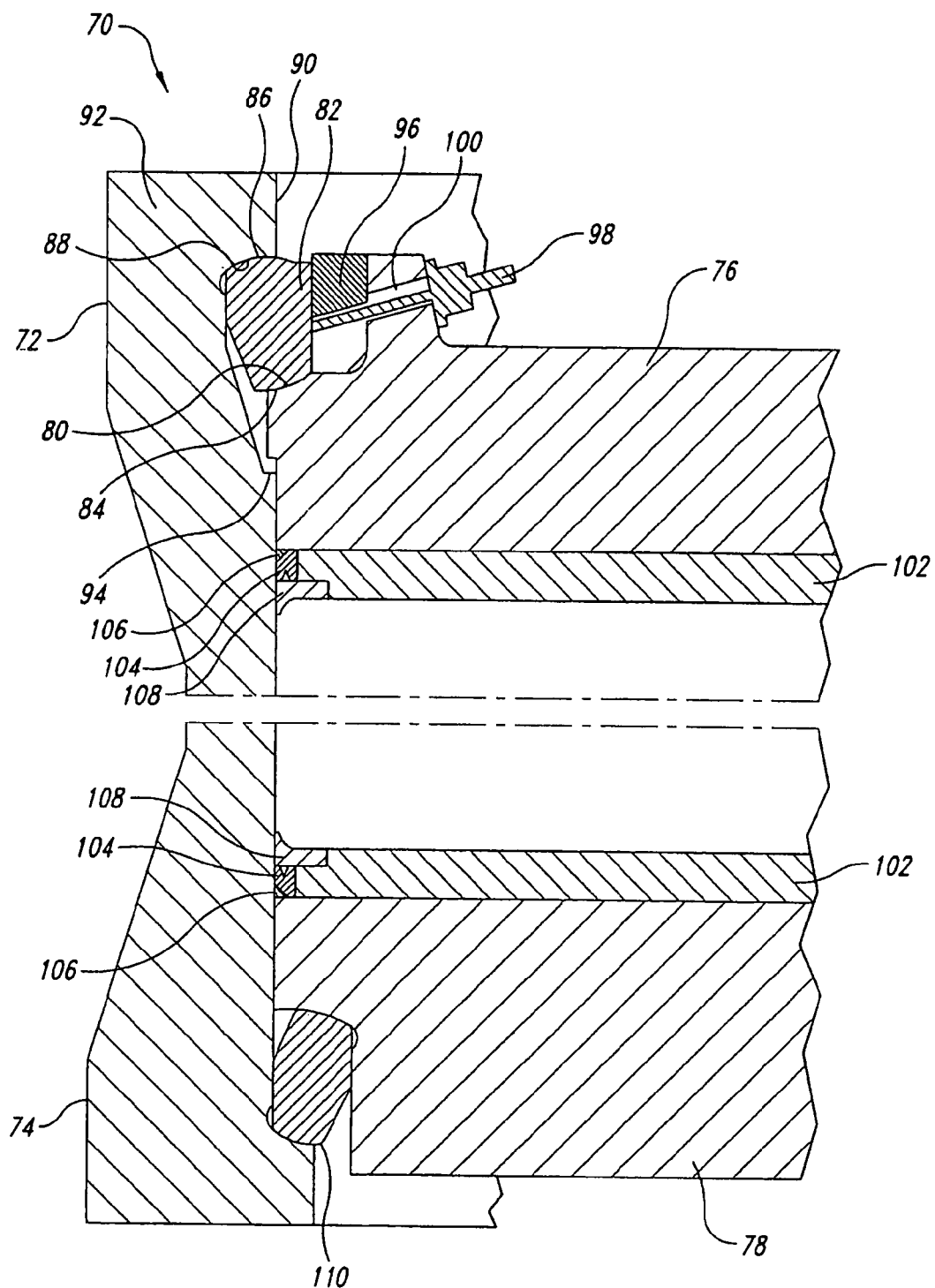
FIG. 4 is a schematic part-sectional view of a pressure vessel with an internal closure, which is comprised in a press according to another embodiment of the present invention.

FIG. 4 schematically shows a part-sectional view of a pressure vessel 70 with an internal closure, which is comprised in a press according to another embodiment of the present invention. The Figure shows both the upper portion 72 and the lower portion 74 of the pressure vessel; however, the middle portion is removed for reasons of clarity. In the pressure vessel 70, an upper cover 76 and a lower cover 78 are thus arranged, between which a space is pressurised for machining a material. The upper cover 76 exhibits, like the cover in FIG. 2, a contact surface 80 which is curved in a longitudinal plane of section which is axial to the pressure vessel 70, against which contact surface abuts the lower contact surface 84 of a force-transmitting element 82. As in FIG. 2, the upper contact surface 86 of the force-transmitting element 82 is in fitted contact with a contact surface 88 of the inner wall 90 of the pressure vessel 70. The wall 92 of the pressure vessel 70 comprises a circular shoulder 94 that limits the downward motion of the upper cover 76 in the pressure vessel 70.

At least to a certain degree, the curved contact surfaces 80, 84, 86, 88 prevent the force-transmitting element 82 from moving radially towards the centre axis of the pressure vessel 70. Moreover, as a supplementary protective measure, a filling element 96 is positioned between the inside of the force-transmitting elements 82 and the upper cover 76, which filling element 96 has essentially the same height as the force-transmitting element 82. A hydraulic piston 98, which extends through the upper cover 76 and the filling element 96, is attached to the side of the force-transmitting element 82 facing the centre axis. The inclination of the hydraulic piston 98 shows that the force-transmitting element 82 is movable in a diagonal direction upwards/inwards. The filling element 96 is formed as a continuous ring round the upper cover 76. The filling element 96 is provided with slots so that it can be slipped onto the hydraulic pistons 98 which are attached to the force-transmitting elements 82. FIG. 4 thus shows a cross-section through, among other things, such a slot. As is evident from the Figure, a duct 100, through which runs the hydraulic piston 98, is formed in the upper cover 76. The inner diameter or width of the duct 100 is larger than the outer diameter or width of the hydraulic piston 98 in order to allow displacement of the upper cover 76 in the vertical direction.

Inside the pressure vessel 70, a furnace (not shown) is adapted to heat the material to be machined. Under the upper cover 76, a cooler plate 102, which is protective against the temperature rise, is arranged with ducts for cooling water. A rubber seal 104 is arranged round the cooler plate 102 and seals against both the inner wall 90 of the pressure vessel 70 and the cover 76. Furthermore, the rubber seal 104 abuts against a metal ring 106 having a triangular cross-section, which metal ring 106 prevents the rubber seal 104 from extruding between the cover 76 and the inner wall 90 of the pressure vessel 70. Yet another seal 108 is arranged below the rubber seal 104. This further seal 108 protects the rubber seal 104 against harmful ascending gases and also serves to hold the rubber seal 104.

A corresponding construction with a cooler plate 102 and seals 104, 106, 108 is also found in the lower portion 74 of the pressure vessel 70, as shown in FIG. 4. In the lower portion 74 of the pressure vessel 70, there is also a force-transmitting element 110 between the lower cover 78 and the inner wall of the pressure vessel. The distribution of contact pressure thus corresponds to that described above. If desirable, the stiffness of the force-transmitting element 110 can be reduced by forming slots therein.

Figure 5:
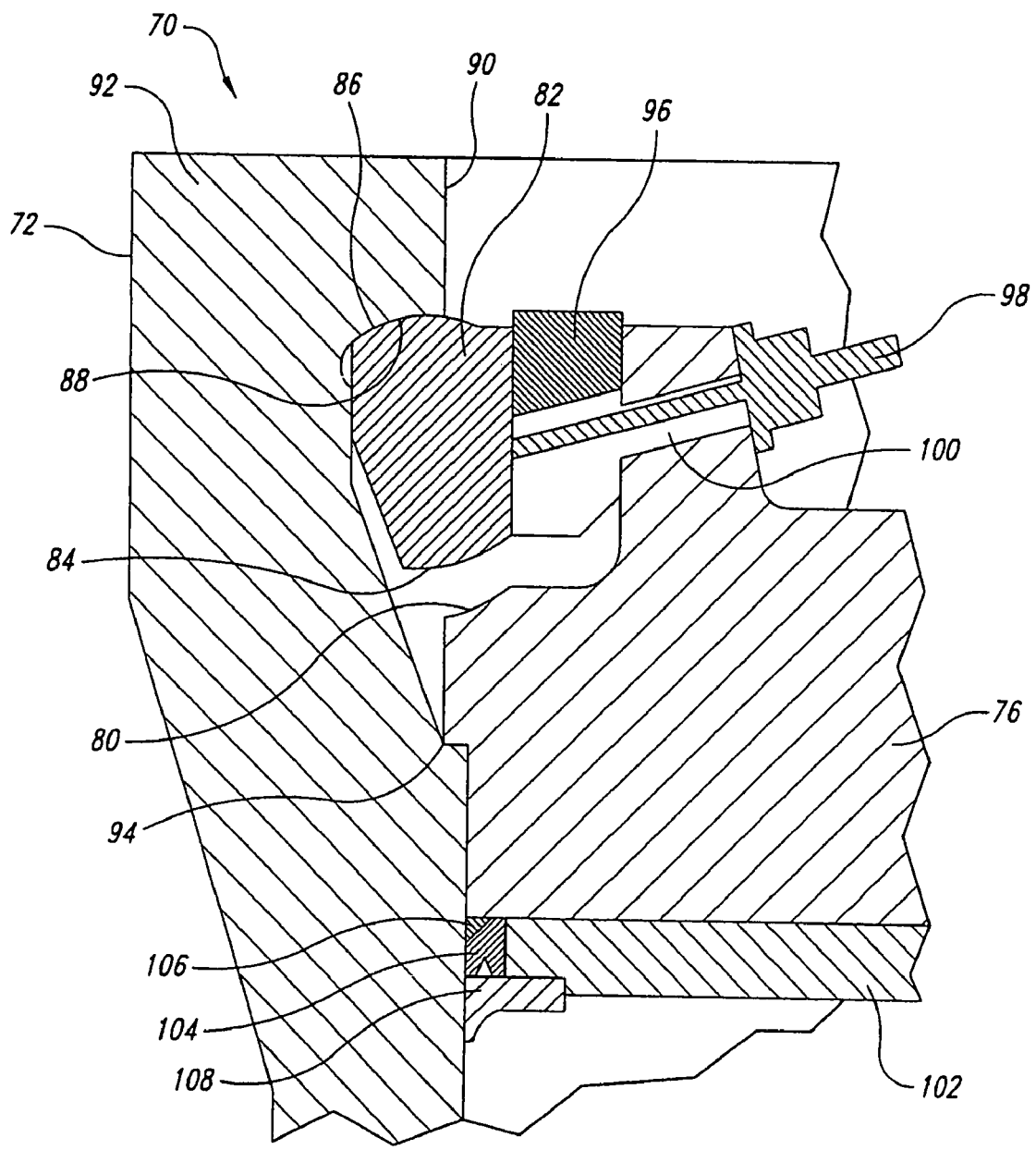
FIG. 5 schematically shows the pressure vessel in FIG. 4 in an unpressurised state.

Whereas FIG. 4 illustrates a typically pressurised state of the pressure vessel, FIG. 5 schematically shows the upper portion 72 of the pressure vessel 70 in FIG. 4 in an unpressurised state, the same reference numerals being used for equivalent parts. The hydraulic piston 98 retains the force-transmitting element 82 against the inner wall 90 of the pressure vessel 70, while the cover 76 is lowered after a completed pressing operation. The cover 76 is lowered only a few millimeters until it meets the shoulder 94 of the wall 92 of the pressure vessel 70. Thus, a gap is formed between the lower curved contact surface 84 of the force-transmitting element 82 and the contact surface 80 of the cover 76. The duct 100 through the cover 76, in which the hydraulic piston 98 runs is sufficiently broad for the hydraulic piston 98 to maintain its inclination also when the cover 76 is lowered. Due to the use of the filling element 96 (instead of a broader upper portion of the cover as in FIG. 2), it is not necessary to lower the cover 76 a distance corresponding to the height of the force-transmitting element 82. The filling element 96 is lifted straight upwards, preferably by means of hydraulic pistons (not shown) in such a manner that the force-transmitting element 82 can be freely pulled out diagonally in the longitudinal direction of the shown hydraulic piston 98, after which the cover 76 and the force-transmitting element 82 can be lifted up so that the inside of the pressure vessel 70 becomes accessible.

Figure 6:
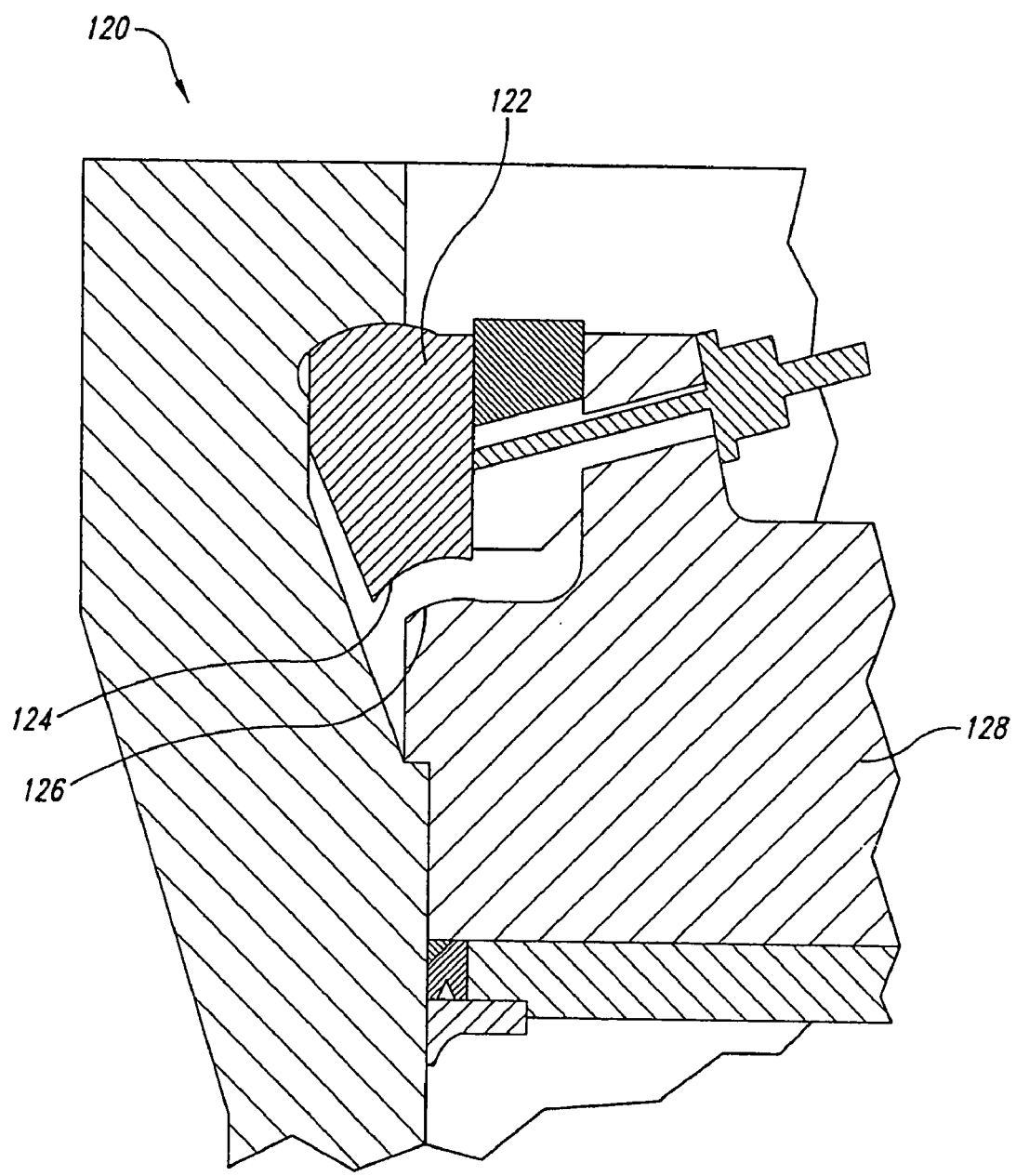
FIG. 6 is a schematic part-sectional view of a pressure vessel with an internal closure, which is comprised in a press according to yet another embodiment of the present invention.

FIG. 6 schematically shows a part-sectional view of a pressure vessel 120 which has an internal closure and is comprised in a press according to yet another embodiment of the present invention. The pressure vessel 120 shown in FIG. 6 largely corresponds to the pressure vessel shown in FIG. 5. However, there is a difference. The lower contact surface 124 of the force-transmitting element 122 and the corresponding contact surface 126 of the cover 128 are curved in the opposite direction. This means that in the press in FIG. 6 these surfaces are concave seen from the centre axis of the pressure vessel, whereas in the press in FIG. 5 the surfaces are convex seen from the centre axis of the pressure vessel.

Figure 7:
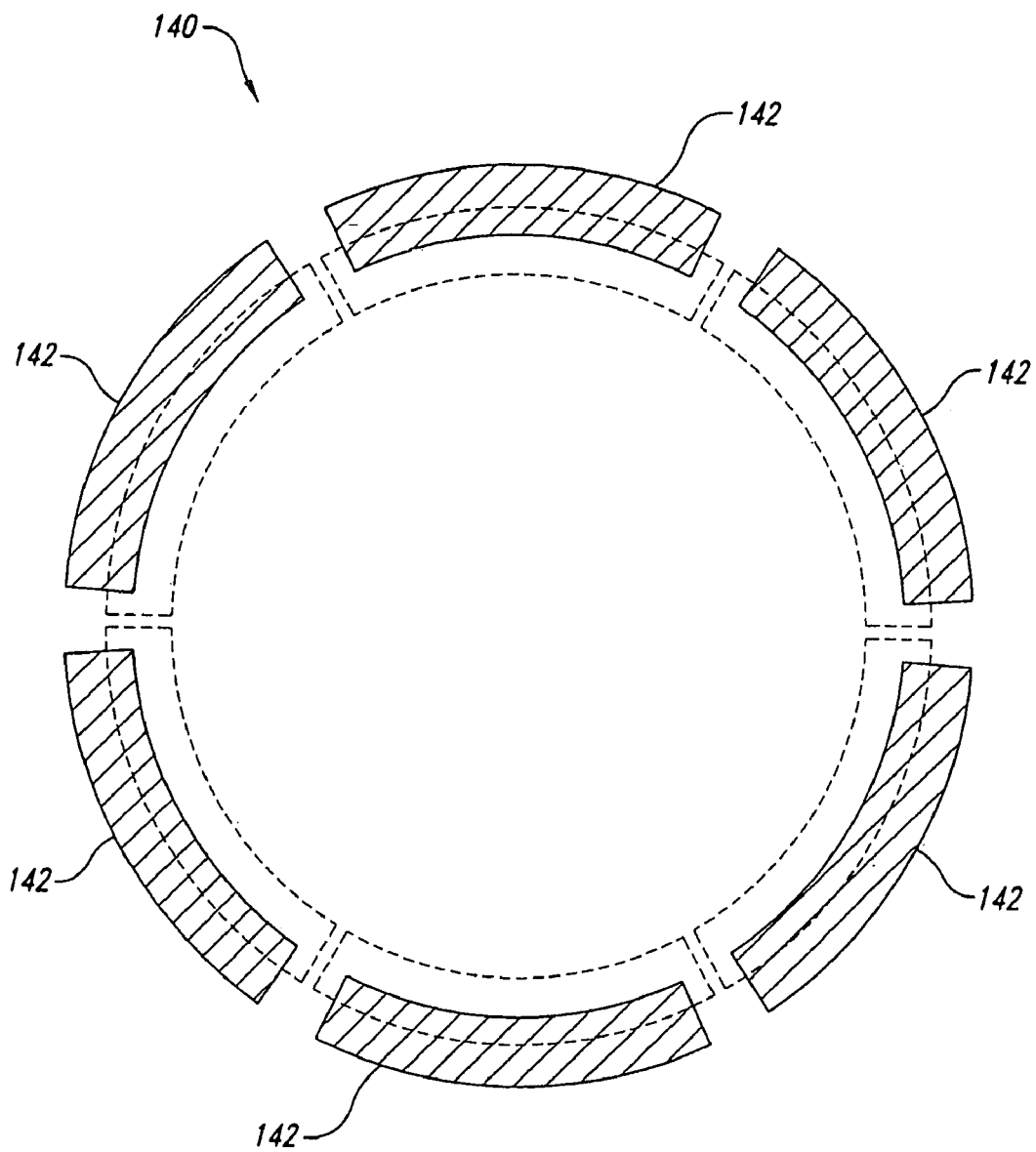
FIG. 7 schematically shows the annular configuration that is formed by the force-transmitting elements comprised in the invention.

FIG. 7 schematically shows the annular configuration 140 which is formed by the force-transmitting elements included in the invention. Thus, six separate force-transmitting elements 142 are shown, each having the shape of a circular arc. The position of the elements 142 when the pressure vessel is pressurised is shown with unbroken lines, while the position of the elements 142 when the cover is ready to be lifted up is shown with dashed lines. As is evident from the Figure, the elements 142 are moved radially inwards after a completed pressing operation so that the cover can be removed and the machined material taken out of the pressure vessel.

Although some embodiments have been described above, the invention is not limited thereto. It should thus be understood that many modifications and variations can be provided without deviating from the scope of the present invention which is defined in the appended claims.

The invention claimed is:

1. A method for opening a cylindrical pressure vessel having an internal closure which includes a cover arranged for closure of the pressure vessel, the cover being arranged to assume two different closure positions in a longitudinal direction of the pressure vessel, a first closure position when the pressure vessel is pressurized, and a second closure position when the pressure vessel is essentially unpressurized, and a number of force-transmitting elements adapted to abut against a contact surface of the cover and a contact surface of an inner wall of the pressure vessel, which method comprises:

relieving pressure from the pressure vessel;

releasing said force-transmitting elements by moving the cover in the longitudinal direction of the pressure vessel, from the first closure position, where the cover is located when the pressure vessel is pressurized, to the second closure position;

translating said force-transmitting elements away from said contact surface of the cover and said contact surface of the inner wall of the pressure vessel inwards toward a longitudinal center axis of the pressure vessel; and removing the cover and said force-transmitting elements.

2. The method as claimed in claim 1 wherein moving the cover from the first closure position to the second closure position includes lowering the cover from an upper position to a lower position, and removing the cover includes lifting the cover away from the pressure vessel.

3. The method as claimed in claim 2 wherein moving said force-transmitting elements includes placing the force-transmitting elements on another contact surface of the cover, and lifting the cover includes lifting the cover with the force-transmitting elements positioned thereon.

4. The method as claimed in claim 2 wherein moving said force-transmitting elements includes retaining said force-transmitting elements in substantially a same position, while lowering the cover from the upper position to the lower position.

5. The method as claimed in claim 4 wherein moving said force-transmitting elements includes first separating said force-transmitting elements and said contact surface of the cover from one another and, subsequently, separating said force-transmitting elements and said contact surface of the inner wall of the pressure vessel from one another.

6. The method as claimed in claim 1 wherein moving said force-transmitting elements is preceded by removing one or more filling elements from between a side of each force-transmitting element and the cover.

7. The method as claimed in claim 1 wherein moving the cover is performed automatically without any external action when pressure is relieved from the pressure vessel.

8. The method as claimed in claim 1 wherein releasing said force-transmitting elements includes releasing said force-transmitting elements from a form-fit state.

9. A method, comprising:

translating a force-transmitting element of a closure of a pressure vessel from a lock position to a release position;

moving the closure within the pressure vessel from a first closure position when the pressure vessel is pressurized to a second closure position when the pressure vessel is essentially unpressurized, thereby locking the force-transmitting element in the lock position;

pressurizing the pressure vessel; and transmitting pressurizing forces from a contact surface of the closure to a contact surface of a wall of the pressure vessel via the force-transmitting element.

10. The method of claim 9, further comprising:

placing a product to be subjected to pressure into the pressure vessel;

moving the closure into the opening of the pressure vessel;

releasing the pressure from the pressure vessel;

moving the closure from the second position to the first position;

translating the force-transmitting element from the lock position to the release position;

removing the closure from the pressure vessel; and removing the product from the pressure vessel.

11. A method for opening a cylindrical pressure vessel having an internal closure which includes a cover and a number of force-transmitting elements adapted to abut against a contact surface of the cover and a contact surface of an inner wall of the pressure vessel, which method comprises:

relieving pressure from the pressure vessel:

releasing said force-transmitting elements by moving the cover in a longitudinal direction of the pressure vessel, from a first position to a second position;

translating said force-transmitting elements away from said contact surface of the cover and said contact surface of the inner wall of the pressure vessel inwards toward a longitudinal center axis of the pressure vessel; and removing the cover and said force-transmitting elements, wherein moving the cover from the first position to the second position includes lowering the cover from an upper position to a lower position, and the step of removing the cover comprises lifting the cover away from the pressure vessel.

12. The method as claimed in claim 11, wherein moving said force-transmitting elements includes retaining said force-transmitting elements in substantially a same position, while lowering the cover from the upper position to the lower position.

13. The method as claimed in claim 12, wherein moving said force-transmitting elements includes first separating said force-transmitting elements and said contact surface of the cover from one another and, subsequently, separating said force-transmitting elements and said contact surface of the inner wall of the pressure vessel from one another.

14. The method as claimed in claim 11, wherein moving said force-transmitting elements includes placing the force-transmitting elements on another contact surface of the cover, and lifting the cover includes lifting the cover with the force-transmitting elements positioned thereon.

15. The method as claimed in claim 11, wherein moving said force-transmitting elements is preceded by removing one or more filling elements from between a side of each force-transmitting element and the cover.

16. The method as claimed in claim 11, wherein moving the cover is performed automatically without any external action when pressure is relieved from the pressure vessel.

17. The method as claimed in claim 11, wherein releasing said force-transmitting elements includes releasing said force-transmitting elements from a form-fit state.

* * * * *